United States Patent [19]

Kroczynski

[11] Patent Number: 4,517,424

[45] Date of Patent: May 14, 1985

[54] HAND-SECURED PUSHBUTTON CONTROL DEVICE

[75] Inventor: Patrice Kroczynski, Vitry, France

[73] Assignee: Inro France, Nanterre, France

[21] Appl. No.: 619,408

[22] Filed: Jun. 12, 1984

Related U.S. Application Data

[63] Continuation of Ser. No. 395,086, filed as PCT FR 81/00130, Oct, 15, 1981, published as WO 82/01345 on Apr. 29, 1982, §102(e) date Jun. 15, 1982, abandoned.

[30] Foreign Application Priority Data

Oct. 17, 1980 [FR] France ................................ 80 22205
Jun. 9, 1981 [FR] France ................................ 81 11278
Oct. 15, 1981 [FR] France ................ PCT/FR81/00130

[51] Int. Cl.³ ........................ H01H 35/00; B41J 5/00; G08C 9/00
[52] U.S. Cl. .................... 200/52 R; 200/5 R; 200/157; 200/DIG. 2; 235/145 R; 340/365 R
[58] Field of Search ............. 200/1 R, 5 R, 5 A, 6 A, 200/52 R, 61.27, 17 R, 61.54, 157, DIG. 2, 18; 340/365 R; 178/18; 235/145 R; 400/479, 483, 486, 487, 489

[56] References Cited

U.S. PATENT DOCUMENTS

| | | | |
|---|---|---|---|
| 2,791,664 | 5/1957 | Rohacs | 200/157 |
| 3,022,878 | 2/1962 | Seibel | 200/18 X |
| 3,136,307 | 6/1964 | Richard | 200/DIG. 2 |
| 3,142,227 | 7/1964 | Stringer | 200/157 X |
| 3,226,501 | 12/1965 | Seserman | 200/157 |
| 3,507,376 | 4/1970 | Kafafian | 400/87 |
| 3,586,807 | 6/1971 | Guttinger | 200/157 |
| 3,700,835 | 10/1972 | Rackson | 200/DIG. 2 X |
| 3,700,836 | 10/1972 | Rackson | 200/DIG. 2 X |
| 3,707,093 | 12/1972 | Worden | 200/6 A X |
| 4,065,650 | 12/1977 | Lou | 200/5 A X |
| 4,180,713 | 12/1979 | Gonzales | 200/61.27 X |

FOREIGN PATENT DOCUMENTS

| | | | |
|---|---|---|---|
| 1601874 | 10/1970 | France | . |
| 622694 | 9/1978 | U.S.S.R. | 400/479 |

OTHER PUBLICATIONS

Kowalski, D. C.; Xerox Disclosure Bulletin, "Semi--Captive Keyboard", vol. 1, No. 2, Feb. 1976, p. 85.
Kennedy, P. J.; IBM Tech. Disclosure Bulletin, "Hand--Held Data Input Device; vol. 26, No. 11, Apr. 1984, pp. 5826, 5827.

Primary Examiner—J. R. Scott
Attorney, Agent, or Firm—James & Franklin

[57] ABSTRACT

The device engages the hand of the operator and maintains same in a fixed position while permitting movement of the fingers. A first rigid part is adapted to be situated adjacent the palm. A second rigid part, aligned with the first part, is adapted to be situated adjacent the back of the hand. The first and second parts are mounted in a fixed, spaced relationship to engage the hand therebetween. The pushbuttons are mounted in sets, each set being aligned with a different finger and adapted to be operated by the pivotal movements of the finger in its plane as the finger is moved relative to the palm.

5 Claims, 17 Drawing Figures

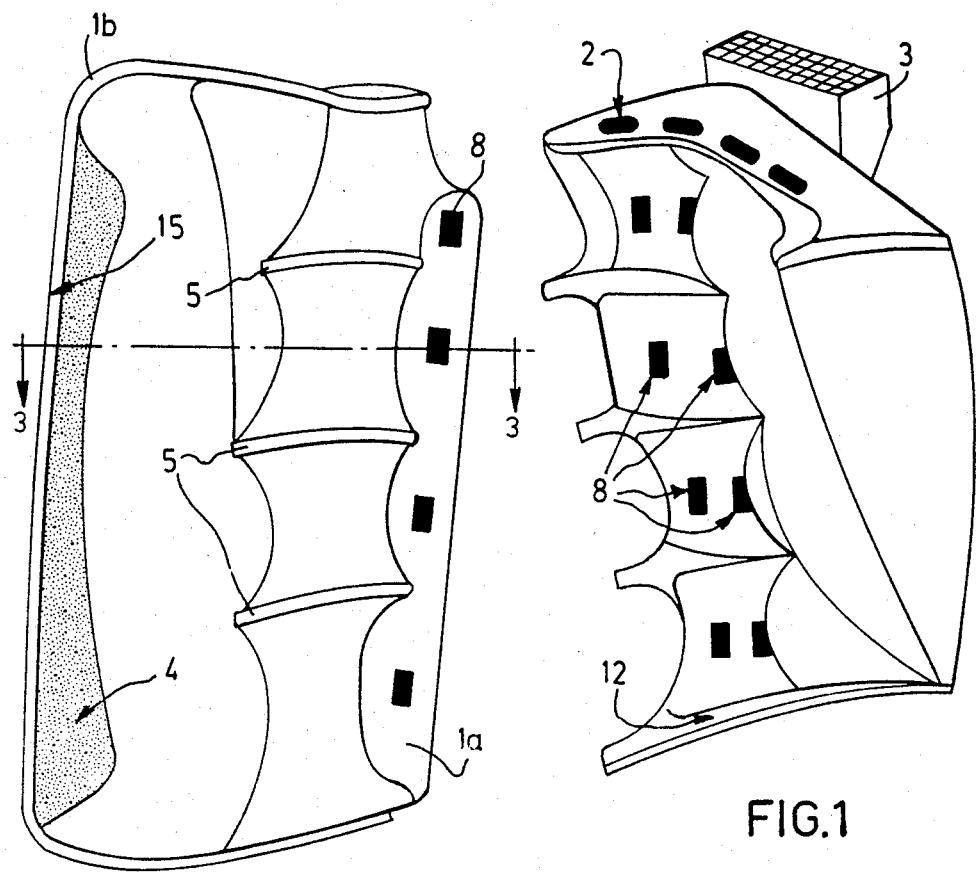
FIG. 2
FIG. 1
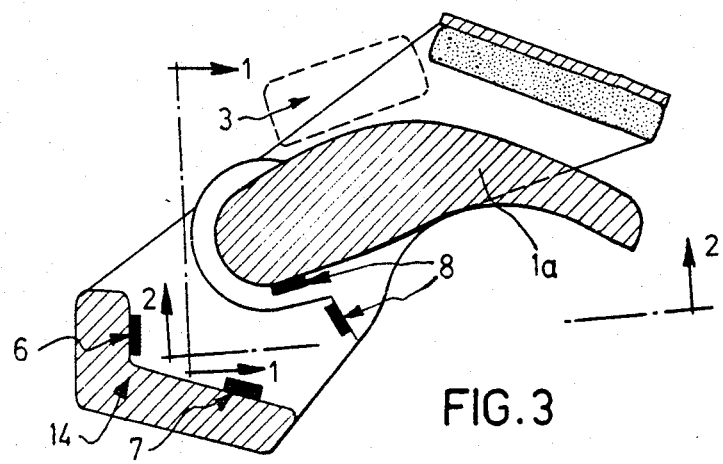
FIG. 3

HAND-SECURED PUSHBUTTON CONTROL DEVICE

This is a continuation of co-pending application Ser. No. 395,086 filed as PCT FR 81/00130, Oct. 15, 1981, published as WO 82/01345 on Apr. 29, 1982, §102(e) date on June 15, 1982 now abandoned.

BACKGROUND OF THE INVENTION

The present invention relates to a pushbutton control device comprising a housing with a plurality of fingeroperated pushbuttons.

Standard keyboards for typewriters or computers are known in which the keys or pushbuttons are arranged flat or in an arc; they are operated by applying force against their top surfaces.

This operation requires muscular coordination and a time for finger displacement relative to the keys. Further, in typing, common words in a particular field of endeavor are repeated frequently, for example, the salutation, introduction and closing of business letters, e.g. Dear Sirs: . . . With reference to your letter . . . Very truly yours . . .

The speed of automatic typing of such expressions for phrases is increased by vocal input if one is able to intervene as a near reflex action in case of an error or a change. Such is not easy with present-day keyboards.

On the other hand, the typing position for conventional typewriters, with the hands and forearms extended from the body, causes back fatigue.

For use by mutes and similarly diabled individuals, keyboard controlled synthesizers have been devised. However, the arrangement of the keyboards in such devices does not permit reflex action speeds sufficient to permit conversations at a suitable speed.

There are cash registers which sense the price and code of goods, but the operator must turn his head to check the goods and then post the prices, which is a source of mistakes and extra fatigue.

These are also keyboards for digital control machines but they are never in the immediate proximity of the hand of the operator controlling the sequences. The intervention time between the instant an anomaly is detected and the intervention on the keyboard is too long.

These are also fighter aircraft stick controls. The stick is provided with three pushbuttons operated by the pilot's thumb. But these pushbuttons are insufficient to control all the systems of the aircraft, therefore controls more or less within the pilot's reach are arranged around his seat. Yet the trend is to equip such aircraft with computers and proportional electrical flight controls. These parameters are displayed on one or more general control screens. The accelerations of such aircraft are so great that it is practically impossible for the pilot to lift his arm.

An object of the present invention is to eliminate such drawbacks and provide a keyboard control device which enables quick control of an appreciable number of operations with considerably reduced fatigue and effort which in the case of an aircraft or the like permits pilot control even when the acceleration is too great to enable him to move his arms.

Another object of the invention is to provide a pushbutton control device which may conveniently be equipped with an accessory such as a microphone, code reading head, or means for producing signals proportional to displacements.

SUMMARY OF THE INVENTION

In accordance with the present invention, a control device is provided comprising pushbuttons adapted to be operated by the fingers and means for engaging the hand of the operator and maintaining same in a relatively fixed position while permitting movement of the fingers. The engaging means comprises a first substantially rigid part adapted to be situated adjacent the palm. A second substantially rigid part, substantially aligned with the first part, is adapted to be situated adjacent the back of the hand. Means are provided for mounting the first and second parts in substantially fixed spaced relation to engage the hand therebetween. The pushbuttons are mounted on a device in sets. Each set is aligned with a different finger and adapted to be operated by the pivotal movements of the fingers in a plane as the finger is moved relative to the palm.

In one embodiment, each pushbutton set includes pushbuttons adapted to be operated by the terminal, middle, and proximal phlange of the same finger. Some of the pushbuttons are operated by the inner side of the finger, and others of the pushbuttons are operated by the outer side of the finger.

Four of the pushbuttons are operated by the four fingers and are positioned approximately in a line and are grouped in a detachable strip.

The device further comprises at least one ring into which the user's terminal phlanges may be inserted. The ring is provided with mechanical connections for actuating a switch having a plurality of positions. Preferably, the switch has a stable central position. The ring is preferably bent to accommodate the shape of the finger.

The device further comprises means, such as a foam pad or the like, for exerting constant pressure on the back of the operator's hand.

The device includes means, such as bosses or the like, for at least partially separating the operator's fingers from one another.

The device of the present invention may be equipped with a uni-directional microphone. The device may be coupled to a recorder which simultaneously records the sound and the signals emitted by the pushbuttons and the switches of the pushbutton control device. The device may additionally be equipped with a bar or a line code reading head.

The housing of the control device may be mounted to a stick which, in turn, is mounted on a fixed support. The stick may be associated with potentiometers which produce signals proportional to the magnitude of its displacement.

The pushbutton control device of the present invention is particularly suitable for use for typing with vocal input word processors, voice synthesizer controls for mutes, music synthesizers, remote controls for handling dangerous substances or contaminants, data acquisition peripherals for computers, even in a recumbent position for disabled persons or persons subjected to very high accelerations, cash registers, controlling or programming digital machine tools or the like in industrial syntaxer robots, and controls for operating and driving all-terrain equipment, high-speed aircraft, spacecraft or the like.

To these and to such other objects which may hereinafter appear, the present invention relates to a pushbutton control device, as described in the following specification and recited in the annexed claims, taken together with the accompanying drawings, wherein like numerals refer to like parts, and in which:

BRIEF DESCRIPTION OF THE DRAWINGS

FIG. 1 shows a sectional view taken on line 1—1 in FIG. 3 of a pushbutton control device with a microphone, for the sake of simplification the outer part is not represented;

FIG. 2 shows a sectional view taken on line 2—2 in FIG. 3 of the same pushbutton control device with applied neoprene foam and bosses separating the operator's fingers;

FIG. 3 shows a horizontal cross-sectional view taken on line 3—3 in FIG. 2;

FIG. 11 shows a pushbutton control device received on the operator's hand, the operator's thumb not being illustrated for the sake of clarity;

FIG. 12 shows a top plan view of the pushbutton control device, with the thumb-operated pushbuttons and the indicating lamps;

FIG. 13 shows the pushbutton control device connected to a signal processing or recording system and placed on a clothing support;

FIG. 14 shows a switch device biased to a neutral position assembled with a control ring;

FIG. 15 shows one of the circuits of FIG. 4 in detail;

FIG. 16 shows another embodiment of the ring-controlled switch;

FIG. 17 shows another embodiment of the ring-controlled switch.

DESCRIPTION OF THE PREFERRED EMBODIMENTS

Figure 4:
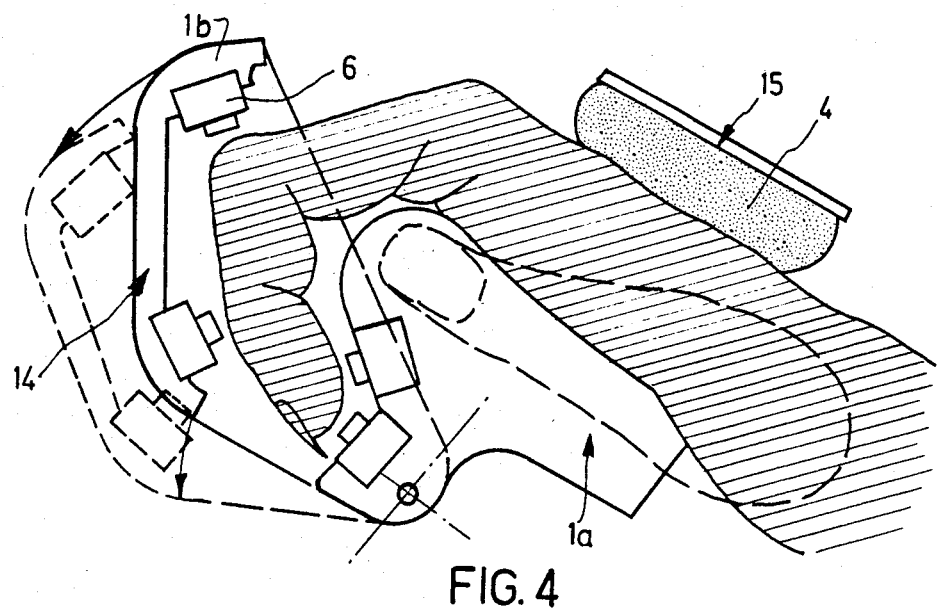
FIG. 4 shows a view similar to that of FIG. 3 for a modified embodiment in which the pushbuttons are grouped in strips of four, the operator's thumb is shown in dotted lines, with the thumb operated pushbuttons and the top of the device deleted so as not to overcrowd the drawing.
Figure 5:
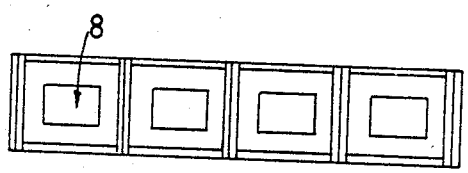
FIG. 5 shows a strip of four pushbuttons.
Figure 6:
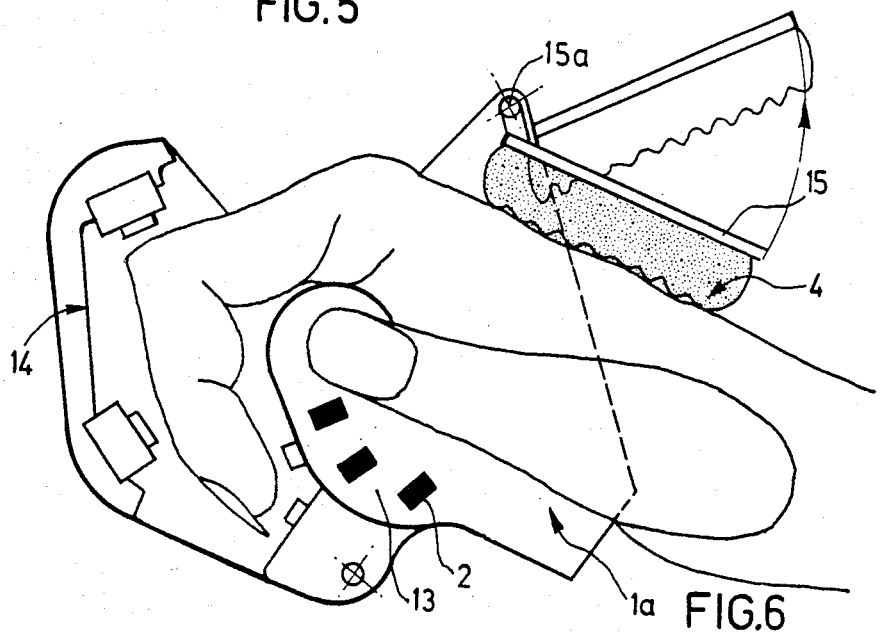
FIG. 6 shows a cross-sectional view similar to that of FIG. 4 with the thumb-operated pushbuttons for the sake of comprehension.
Figure 7:
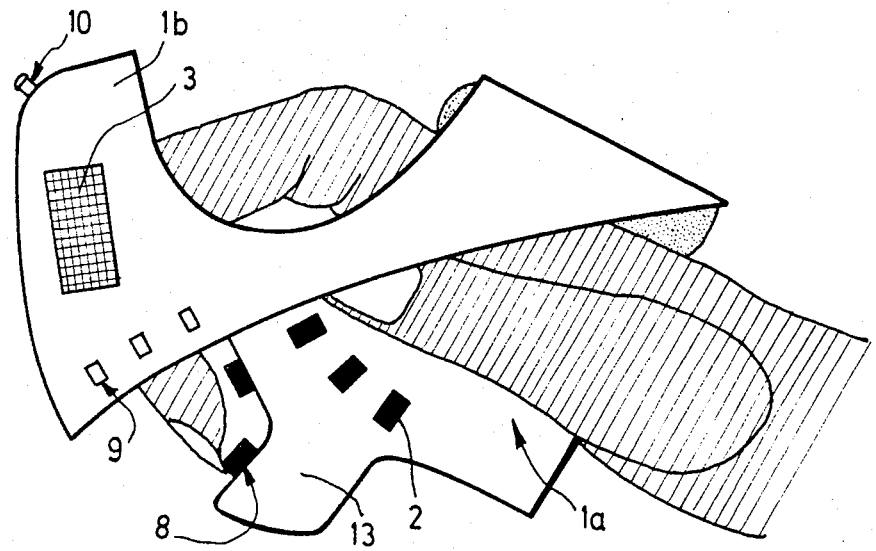
FIG. 7 shows a complete top plan view of the device of FIGS. 1-3, with the microphone, the indicating lamps, the thumb-operated pushbuttons and the bar or line code reading head.

The pushbutton control device disclosed in FIGS. 1-8 comprises a housing 1 held around the user's hand by gripping between the palm, hypothenar eminence and the back of the hand.

The housing 1 comprises a substantially rigid palm portion 1a and an outer portion 1b which forms a bridge and is hinged to the palm portion by means of a pivot 1c. The portions 1a and 1b are adapted to the user's hand in the relaxed position. The palm portion bears four thumb-operated pushbuttons. A unidirectional microphone 3 is in addition borne by the outer portion. The latter further bears on its inner face a foam neoprene pad 4. The palm portion 1a has bosses 5 for separating the fingers. The outer portion 1b bears pushbuttons 7 operated by the inner side of the proximal phalanges of the fingers except for the thumb and pushbuttons 8 operated by the ends of middle phalanges of the same fingers, while the palm portion 1a bears two pushbuttons 8 for each of the same fingers operated by the terminal phalanges. The thumb operates, for its part, four pushbuttons 2 borne by the palm portion and disposed in a plane and operable in a direction perpendicular to that of the other pushbuttons or keys. Indicating lamps 9 (FIG. 7) are provided on the upper side of the outer portion and it also bears a bar or line code reader 10. The lower part 12 of the outer portion 1b comprises a wide rest for holding the abductor of the little finger.

It is observed that the outer portion 1b comprises a notch between the section 14 which bears the pushbuttons 6,7 and the section 15 which bears the foam plastic holding pad 4. This notch permits aeration of the articulation zones between the phalanges of the fingers, exept for the thumb, and the corresponding metacarpals, for better user comfort. The substantially rigid portion 15 is adapted to be situated adjacent the back of the hand, is aligned with the palm portion, and held in substantially fixed spaced relation thereto so as to firmly engage the hand therebetween. To facilitate introduction of the operator's hand between the palm portion and portion 15, portion 15 may be pivotally mounted to the remainder of the housing at 15a. In addition, to enhance comfort, a foam plastic pad 4 or the like may be affixed to the inside of portion 15.

Figure 8:
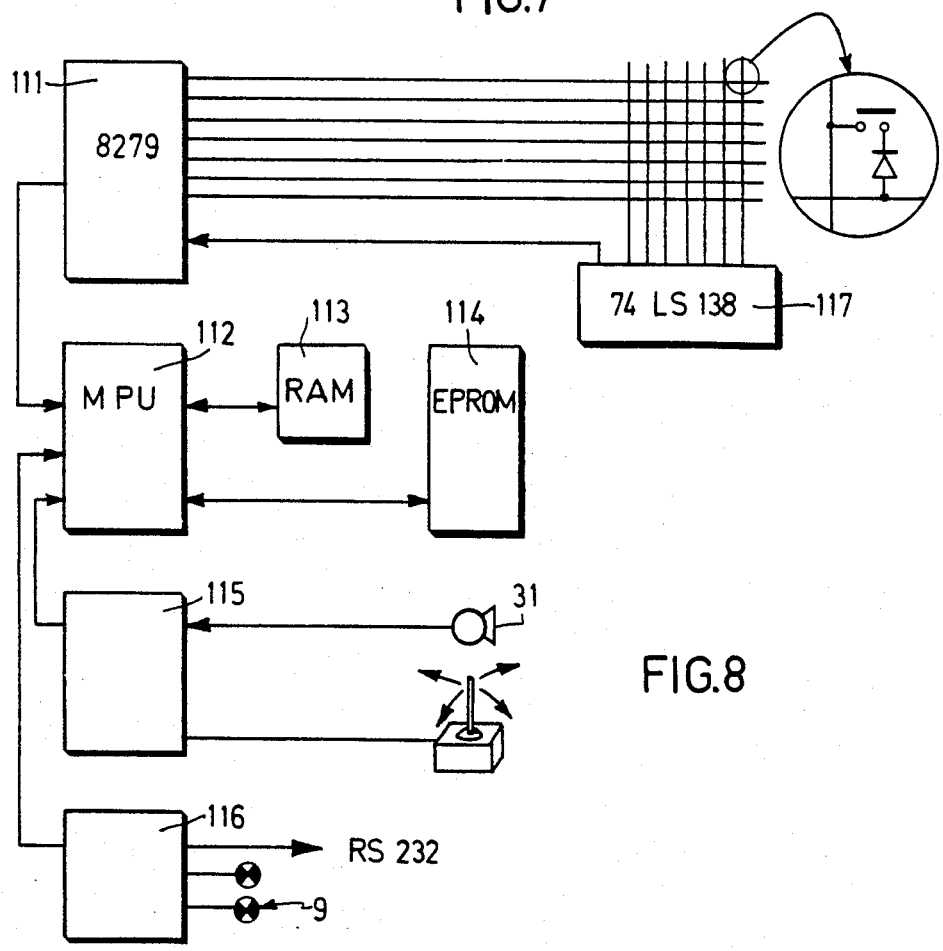
FIG. 8 shows a block diagram for the operation of the circuits of the device.

FIG. 8 shows a block diagram of the operating principle of the circuits of the pushbutton control device with the circuit 111 for monitoring the pushbuttons and transmitting the address to the processor 112, associated memories 113 and 114, the microphone input interface 115, the microphone 31, the output interface 116. A circuit 117 has been coupled to circuit 111 to ensure the reading of the columns of the matrix of the pushbutton control device.

According to a first embodiment, the pushbuttons may be grouped into strips of fours. This arrangement simplifies the manufacture and maintenance of the pushbutton control device.

On the other hand, different operating forces are determined by the type of interchangeable strips, the user selecting the operaring force which suits him.

The pushbuttons of the pushbutton control device are provided according to various embodiments:

(1) Reed relay pushbuttons in which the reeds are sealed in a glass tube and actuated by the displacement of a small permanent magnetic close to the tube.

(2) Pushbuttons with saturable toroidal cores. The principle utilizes the saturation and unsaturation of the toroidal-shaped magnetic circuit of a small transformer. The magnetic change of state is obtained by the displacement of a small permanent magnet in the toroidal core, when the pushbutton is depressed. The transformer coupled to an oscillator provides a detectable level output when it is unsaturated. The saturation of the toroidal core suppresses the transmission of the signal from the oscillator to the sensor.

(3) Mechanically-operated pushbuttons. Contact rebound will be eliminated by an antirebound circuit.

(4) Hall effect pushbuttons. The displacement of a permanent magnet by pressing the pushbutton is detected in a Hall effect transducer.

(5) Capacitive effect pushbuttons. The plate fixed to a pushbutton augments the coupling capacity of two plates side by side when the pushbutton is pressed. These two plates connected between an oscillator and an amplifier cause a very different output level depending on the coupling.

(6) Membrane pushbuttons. Each pushbutton corresponds to a pair of isolated contacts on a support. Above the support a Mylar film is pierced with a hole facing each pair of contacts; an elastomer conductor placed above the Mylar film electrically connects the contacts on the support when pressed. This assembly is arranged under pushbutton reflectors or directly printed in order to symbolize the location of the pushbuttons.

A particularly interesting variant of FIG. 1 comprises a triple top joint pushbutton (11) which eliminates the proximal and middle phalange pushbuttons (6) and (7).

The pushbutton control device of the present invention is broken up into various parts:

(1) The inner pushbuttons (13) which are grasped in the hand and comprise terminal phalange-and thumb-operated pushbuttons;

(2) The outer pushbuttons (14) which comprise proximal and middle phalange-operated pushbuttons.

(3) The mechanical hand gripping (15) in the form of a pad (14) of foam neoprene or other compressible material; a sanitary covering insertible between the foam pad and the back of the hand;

(4) The directional microphone (3) for vocal input. In some uses it may be mounted on an extension in such a manner as to extend it from the user's hand. In other embodiments for piloting fast vehicles, the microphone may be replaced by a throat microphone or a helmet microphone.

(5) The electronic control and handling circuits for the pushbutton control device which indicates by means of indicating lamps (9) the normal or abnormal data acquisition process.

(6) Various options such as the bar or line code reader (10) for cash registers when pushbutton control device is used for cash register data acquisition in a supermarket. The photocell for the light pencil on a CRT. The stick for introducing proportional actions in the data acquisition process. The stick is fixed at the lower part (12) of the pushbutton control device, it is secured to two potentiometers which detect the displacements along two axes of a reference plane. This type of stick has been used for many years for remote controls.

For some uses such as voice simulation a rotation control device for the pushbutton control device is integrated; its operation is based on locating by Hall effect a permanent magnet on the clothing of the user. This device permits the increase in the combination of the pushbuttons in case only one hand can be used or to intervene fast, at the reflex speed, without cancelling the data acquisition in progress, by merely rotating one's wrist.

A special belt is used for carrying the apparatus, it comprises two supports formed as upwardly directed jack plugs. These plugs are used in an alternative embodiment of the invention for collecting data from the pushbutton control device and for charging the pushbutton control device batteries.

The belt comprises a remote-control device for transmitting data from the pushbutton control device. Naturally in most uses the pushbuttons are simply connected by a conductor or connector to a central data processing unit.

Nevertheless, the invention permits wireless use of the pushbutton control device owing to the transmitter belt. Another embodiment for supply of electrical energy to the control device pushbuttons consists in providing induction loops in the jack plugs of the belt. In this case a secondary winding inside the control grip coaxially around the jack plug recovers the energy and charges the batteries of the pushbutton control device.

For vocal input by the microphone of the pushbutton control device the zero-crossing analysis method is employed. This method utilizes the first derivative of the vocal signal to encode a matrix of phonemes then speech recognition by the microprocessors (112) is ensured by the comparison of the phonemes spoken by the speaker with those of the matrix. The elements of the matrix are stored in a nonvolatile memory, the conversion and analysis program is stored in the ROM. As this method is known it need not be described further.

Another technique may be advantageously used as a constructional variant of the device:

The phonemes of the speaker are analyzed by a series of 16 bandpass filters and are converted by means of an analog/digital converter into digital information characterizing the durations and characteristics of the frequency spectrum.

Therefore it is a matter of spectral analysis.

The data is grouped into the form of a table, each datum representing a recorded word which will be used thereafter for comparison with new words.

The voice input reduces the data acquisition time, the movement of the operator, staff requirements for data acquisition, and training time.

Finally, it will be noted that pushbutton control device of the present invention is made of injected ABS (acrylonitrile-butadiene-styrene) or another type of injected plastic material, that certain detachable connection parts, like the junction between the inner and outer parts, may very well be made of stainless steel or anodized aluminium.

Finally, the pushbutton control device may be provided with any decoration, paint, personalized touch, as well as devices of opening and locking the clamping of the back of the hand.

Particularly interesting uses may be the manual control human voice synthesizers for mutes, and all data acquisition or controls requiring near reflex reaction speeds.

Figure 9:
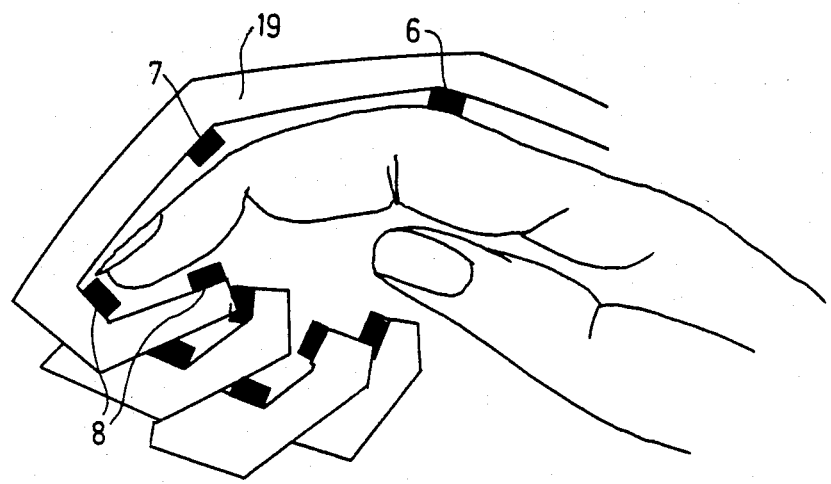
FIG. 9 shows a view similar to that of FIG. 4, illustrating another embodiment.
Figure 10:
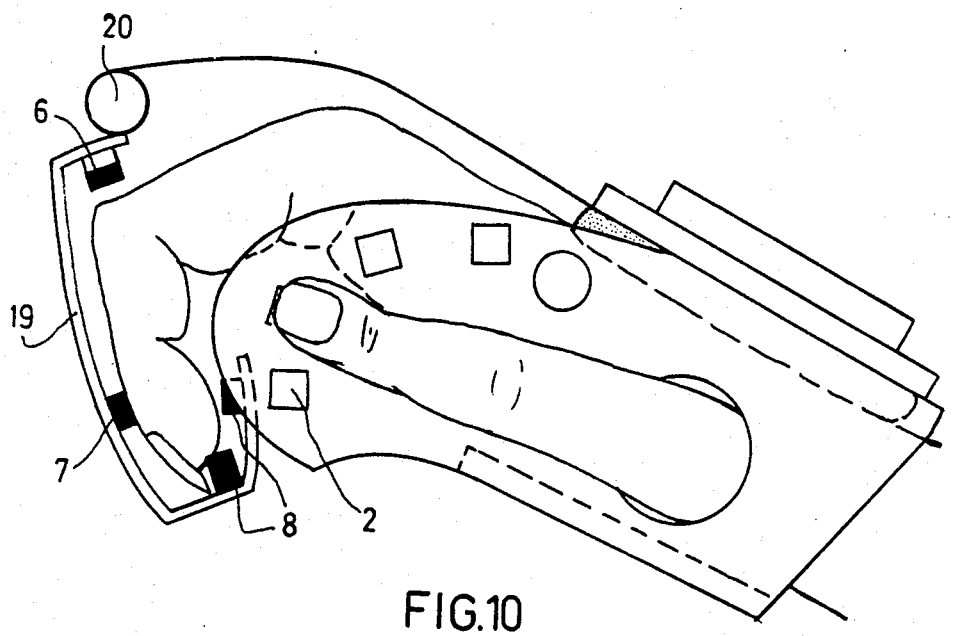
FIG. 10 shows a view similar to that of FIG. 6, relative to an embodiment very similar to that of FIG. 9.

FIGS. 9 and 10 show constructional variants of the pushbutton control device. The terminal, middle or proximal phalange-operated pushbuttons for the same finger are borne by the same support 19 adapted to shape of the user's finger, and the supports 19 for the four fingers are fixed in suitable positions relative to the palm portion 1a (not illustrated in FIG. 9). In FIG. 10 the same supports 19 are connected to the palm portion 1a by a pivot 20 which of course is provided with means for locking it during the operation and unlocking it for introducing or removing one's hand.

This constructional mode permits an easier adaptation to various hand configurations, thanks to a series of suitable supports 20.

FIGS. 11–17 relate to another type of pushbutton control device construction.

This one comprises two rings or apertured plates 21,22 covered with elastic material such as foam material and shaped to bear (21) against the palm and (22) against the back of the hand.

The rings or aperture plates are connected to each other by a top 23 which is fixed to their upper parts.

A bottom 24 fixes their lower parts.

This assembly comprises a main frame.

On the frame are fixed four switches 25 by means for adjustable spacers so as to accommodate the user's hand.

The switches are controlled by actuators 26 on which rings 27 are fixed. A selection of rings are available to adapt to different hand configurations. A protective cover 28 fixed to the main frame is provided in front of the fingers so as to protect the switches from any inadvertent action.

On the top 23 are noted thumb-operated pushbuttons 29 as well as a pushbutton for turning the system on and off.

The indicating lamps 31 ensure indication of the mode of operation of the pushbutton control device. Indeed, during vocal input, a word like "five" may be interpreted in a number of ways. It is important to impart to the machine by means of the pushbuttons whether it is "five" in letters or numbers, whether to stroke in at five, whether code memory five is used, or similar instructions.

A one-hand pushbutton control device has four or five pushbuttons for the thumb and four pushbuttons per finger for the other fingers, which may be inadequate for typing or other data acquisition uses. In this case it is possible, within the scope of the invention, to include inclinometers defined by mercury switches or another system such as a reed relay and a permanent magnet, or similar devices.

Owing to this expedient the forward, rearward, rightward or leftward tilting of the pushbutton control device provides electric signals which in combination with the other pushbuttons, increases the number of signal pushbuttons plus a direction inclinometer to about 80, which is more than adequate for the intended uses.

Another variant of the pushbutton control device consists in connecting to a recorder for off-line use. A track or a part of the recorder will pick up the sound, the other will pick up the pushbutton codes.

Another embodiment which is illustrated in FIG. 3 consists in connecting the pushbutton control device by a line 32 to a high-frequency transmitter supplied by a power pack 34. This transmitter serves as a support for the pushbutton control device when it is not in use.

The assembly is fixed on a leather or plastic support 35 for securement on clothing.

Data thus transmitted is acquired by a data processing system for processing. In this case it is particularly interesting to communicate with the system in a duplex mode, the controls 36 permit the selection of the transmission mode.

Another interesting mode is two-way transmission with the return path effected through a voice synthesizer. The output of the loudspeaker 37 informs the user as to the satisfactory acquisition of data.

It should be noted that when an error of vocal data acquisition occurs, it is unnecessary to use the pushbuttons in the typing mode, it is sufficient to use it in the spelling mode.

The control units of the pushbutton control device comprise a ring 27 which is slightly concave so as to adapt to the shape of the second interplangeal articulation. This functional shape permits it to be pushed in the direction A in FIG. 14, that is generally along the axis of the ring 27.

Figure 11:
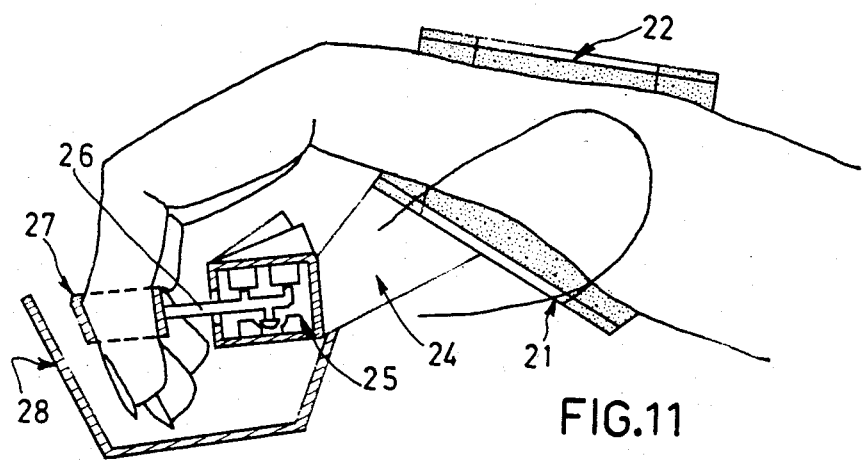
FIGS. 11-17 are views relative to a further embodiment of the invention more specifically described below.
Figure 12:
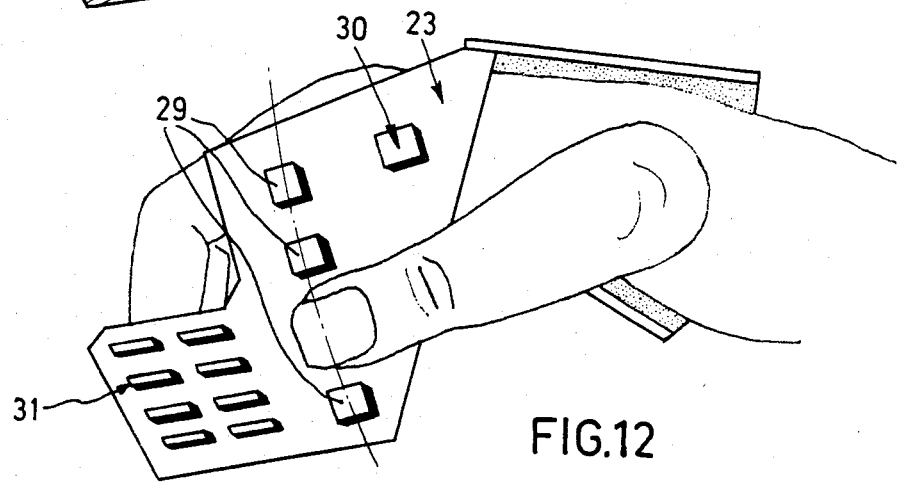
Figure 13:
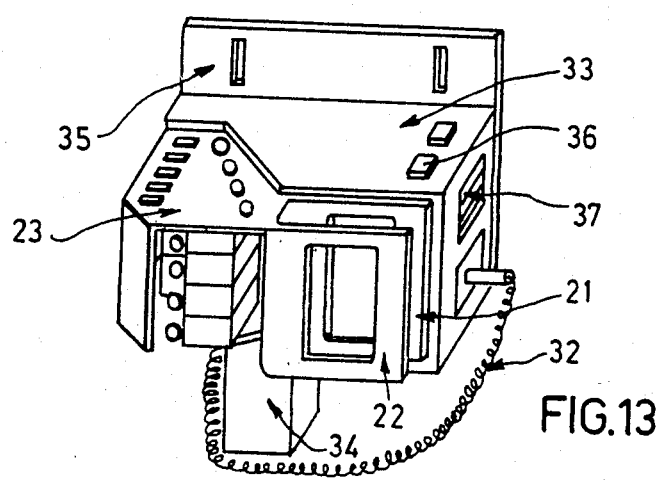

It should be observed that in FIG. 11 the position of the user's hand: that is a relaxed position of the palmar fascia muscles and the lumbrical muscles which permits a stable reference position of the switch to be obtained effortlessly.

Figure 14:
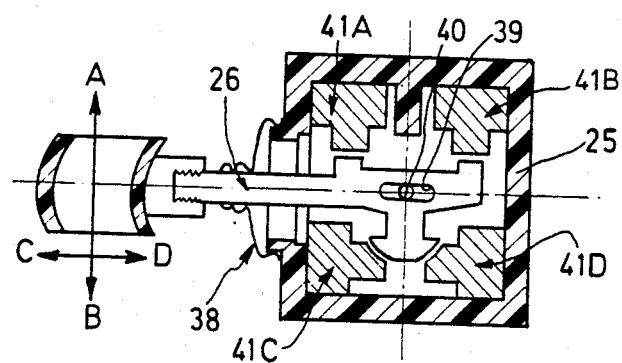

It has been observed that the easiest separate movements of each finger susceptible of reflex action are those denoted by arrows A, B, C, D in FIG. 14, which correspond, respectively, to the pivotal movements of the finger in its plane about the center of the hand and to the opening and closing of the hand. In this figure, the rod 26 of the switch is protected at its entrance into the switch housing by a small bellows 38.

This rod is apertured by a slot 39 which must rotate and translate about axis 40.

In case of a displacement along axis A-B, the pushbuttons 41A and 41B will be operated. If, on the contrary, with a displacement along axis C-D, pushbuttons 41C or 41D will be operated. The switches 25 may be assembled mechanically relative to one another according to various methods while permitting an adjustment at the time of assembly.

These techniques, like notched connections, dovetail joints, and adhesives are known; they will not be described further.

Figure 15:
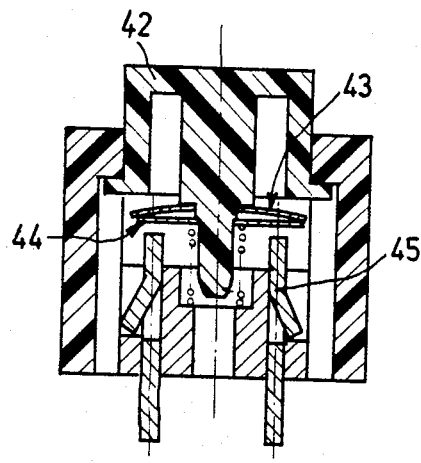

Likewise, a detail of a switch 41 is illustrated in FIG. 15 but other variants exist, are part of the state of the art, and may be suitable for the present invention.

A plunger 42, a snap spring 43 and a contact member 44 for engagement with terminals 45 are noted. This type of plunger is highly suited for this appplication by reason of the snap over which makes the pushbutton operation easy. Nonetheless, with pushbuttons integrated into the switch as in FIG. 16 where there is no snap over, it is possible to obtain satisfactory operation. For this purpose the displacement of the rod or lever 26 must be sufficiently resistant and the contact must at the same time trigger a bleep.

Figure 16:
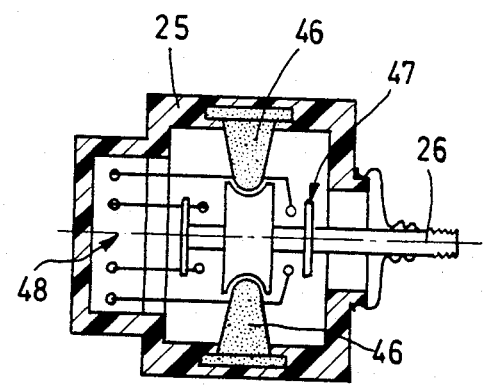

In FIG. 16 the central position is obtained by neoprene lugs 46. The stops 47 are also adapted to make contact with the leads. A junction box 48 is provided at the rear of the switch housing.

Figure 17:
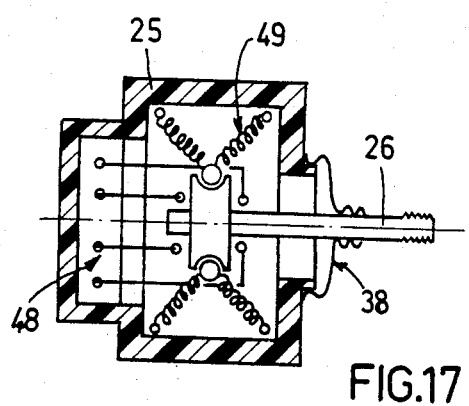

In FIG. 17 a sensitive effect is obtained when the spring 49 yields upon contact. For the switches, reed relay pushbuttons may be used, as well as Hall effect pushbuttons, capacitive effect pushbuttons and membrane pushbuttons.

It is recommended to use antirebound circuits with the pushbuttons.

The pushbutton control device according to the invention described herein may be made of plastic or metal with some parts detachable, with decorations, and in conjunction with vocal, optical reader or other acquisition or input systems.

The invention is particularly suitable for data acquisition.

It is possible, by reflex action, to operate the various pushbuttons which in combination with a throat or other microphone speech input device permits more efficient data acquisition in real time.

For use of such a pushbutton control device, training is very fast and includes programmed exercises and is comparable to learning Morse code by reflex actions.

While only a limited number of preferred embodiments of the present invention have been disclosed for purposes of illustration, it is obvious that many variations and modifications could be made thereto. It is intended to cover all of these variations and modifications which fall within the scope of the present invention, as defined by the following claims:

I claim:

1. A control device comprising a body which can be maintained in a substantially fixed position relative to the palm and back of the user's hand without immobilizing the user's fingers; and a plurality of sets of switch means supported by said body, each of said sets of switch means being aligned with and adapted to be operated by a different finger, each of said pushbutton sets comprising first, second, third, and fourth switch means, said first and second switch means being adapted to be actuated by pivoting of the aligned finger in first and second senses, respectively, about the center of said hand, in directions substantially parallel to the palm, from a rest position to positions corresponding to the opening and closing of the hand; said third switch means in each set being adapted to be operated by the aligned finger through the movement of the finger in a direction substantially perpendicular to the palm from the rest position to a position relatively remote from the palm; and said fourth switch means in each set being adapted to be operated by the aligned finger through the movement of the finger in a direction substantially perpendicular to the palm, from the rest position to a position relatively proximate to the palm.

2. The device according to claim 1, wherein said third switch means in each of said sets is operable by the external face of the middle or proximal phalange of the aligned finger.

3. The device according to claim 1, wherein said sets of switch means are grouped on a detachable strip.

4. The device according to claim 1, comprising a ring adapted to be carried by one of the fingers, said ring having a shape adapted to transmit a traction by a movement of closing said finger, and provided with mechanical connections for actuating means having a plurality of switches which are operated in different manners by the four said different movements of said finger.

5. The device according to claim 4, wherein said ring is concave so as to adapt it to the shape of the second interphalangeal articulation.

* * * * *